(12) United States Patent
Someya (10) Patent No.: US 8,068,801 B2
(45) Date of Patent: Nov. 29, 2011

(54) ELECTRIC WAVE RECEIVING APPARATUS

(75) Inventor: Kaoru Someya, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 577 days.

(21) Appl. No.: 12/145,698

(22) Filed: Jun. 25, 2008

(65) Prior Publication Data
US 2009/0023408 A1  Jan. 22, 2009

(30) Foreign Application Priority Data

Jul. 19, 2007  (JP) ................................. 2007-188317

(51) Int. Cl.
*H04B 1/16* (2006.01)

(52) U.S. Cl. .................. 455/200.1; 455/234.2; 455/132; 455/272; 455/63.1; 375/140; 375/146

(58) Field of Classification Search ............... 455/200.1, 455/234.2, 132, 272, 63.1; 375/140, 146
See application file for complete search history.

(56) References Cited

U.S. PATENT DOCUMENTS

| | | | | |
|---|---|---|---|---|
| 6,728,298 | B1 * | 4/2004 | Okubo et al. .................. | 375/146 |
| 2005/0147080 | A1 * | 7/2005 | Haefner et al. ................ | 370/350 |
| 2005/0175039 | A1 * | 8/2005 | Haefner et al. ................ | 370/503 |

FOREIGN PATENT DOCUMENTS

| | | |
|---|---|---|
| CN | 1684010 A | 10/2005 |
| JP | 04-341027 | 11/1992 |
| JP | 05-121947 A | 5/1993 |
| JP | 11-346169 | 12/1999 |
| JP | 2005-005847 A | 1/2005 |
| JP | 2005-079981 A | 3/2005 |

OTHER PUBLICATIONS

Japanese Office Action dated Jun. 28, 2011 and English translation thereof in counterpart Japanese Application No. 2007-188317.
Chinese Office Action dated May 25, 2011 (and English translation thereof) in counterpart Chinese Application No. 200810133339.3.

* cited by examiner

*Primary Examiner* — Sanh D Phu
(74) *Attorney, Agent, or Firm* — Holtz, Holtz, Goodman & Chick, PC (57) ABSTRACT

An electric wave receiving apparatus comprises: an antenna; an amplifier; filter circuits that extract signals in different frequency bands from an output of the amplifier; detector circuits that demodulate time codes from outputs of the filter circuits; automatic gain control circuits that generate gain control signals from the detector circuits; a selector that selects one gain control signal indicating a maximum signal level among the gain control signals; and an arithmetic processing section to be able to analyze the time codes of outputs of the plurality of detector circuits, wherein the one gain control signal is supplied to the amplifier to control an amplification factor of the amplifier so that signal levels output from detector circuits do not become excessive, and the arithmetic processing section selects an output to enable the analysis of the time code among the outputs of detector circuits to perform the analysis of the time code.

9 Claims, 10 Drawing Sheets

FIG. 7A DEMODULATED SIGNAL a

FIG. 7B DEMODULATED SIGNAL b

FIG. 7C DEMODULATED SIGNAL c

1 SECOND

FIG. 7D OUTPUT Rx

10ms

FIG. 8A FIRST FREQUENCY SIGNAL Rxa

FIG. 8B SECOND FREQUENCY SIGNAL Rxb

FIG. 8C THIRD FREQUENCY SIGNAL Rxc

10ms

FIG. 9A FILTER OUTPUT fa

FIG. 9B FILTER OUTPUT fb

FIG. 9C FILTER OUTPUT fc

ELECTRIC WAVE RECEIVING APPARATUS

CROSS-REFERENCE TO RELATED APPLICATIONS

This application is based upon and claims the benefit of priority from the prior Japanese Patent Application No. 2007-188317, filed Jul. 19, 2007, the entire contents of which are incorporated herein by reference.

BACKGROUND OF THE INVENTION

1. Field of the Invention

The present invention relates to an electric wave receiving apparatus to receive an electric wave including a time code.

2. Description of the Related Art

In recent years, it has become possible to form a high-accuracy filter circuit having a small mounting area and a narrow passing band of signals by a micro electro mechanical system (MEMS) technique. Accordingly, it becomes possible to configure an electric wave receiving circuit capable of selectively receiving the signals of a plurality of receiving channels by using a variable filter composed of a plurality of filter circuits having mutually different passing frequency bands arranged in parallel with one another to be used to switch the filter circuit through which a received signal passes.

Moreover, as a technique related to the present invention, Japanese Patent Application Laid-Open Publication No. 2005-79981 discloses a technique using an MEMS filter as an intermediate frequency (IF) filter in a superheterodyne system receiver.

Moreover, Japanese Patent Application Laid-Open Publication No. 2005-5847 discloses a technique of applying a band-pass filter passing only signals having specific frequency components by using a plurality of MEMS filters in a reception section of a communication instrument.

Moreover, Japanese Patent Application Laid-Open Publication No. Hei 05-121947 discloses the technique of selectively extracting a signal of a specific frequency by connecting a plurality of high-frequency filters in parallel at the subsequent stage of an antenna in a direct conversion system receiving circuit to transmit the extracted signal to a mixer.

There is a case of performing the processing of searching for a receiving channel through which a signal can be received by receiving the signals of a plurality of receiving channels, and switching the receiving channels, if it is impossible to know the receiving channel of a wireless signal.

SUMMARY OF THE INVENTION

However, usually, it becomes difficult for the receiving apparatus configured to switch receiving channels with the use of a variable filter including a plurality of filter circuits having different passing frequency bands in parallel to one another to switch receiving channels at a high speed, and consequently the receiving apparatus has a problem of the necessity of a very long time for the search processing of a receiving channel.

That is, although it is normal to amplify a received signal by automatic gain control (AGC) in a receiving circuit in order to keep a demodulated signal level constant, an AGC circuit has a comparatively large time constant characteristic, and a time for about several seconds to about ten and several seconds is necessary until the automatic gain control becomes stable when a receiving channel is switched. Consequently, it becomes necessary to wait a certain time until a stable detection signal can be obtained when a variable filter is switched to change a receiving channel, and it takes a long time to search the signals of all the receiving channels.

It is an object of the present invention to provide an electric wave receiving apparatus capable of searching for a receiving channel through which a predetermined signal can be received at a high speed in a receiving apparatus to perform the switching of receiving channels by the use of a variable filter equipped with a plurality of filter circuits having passing frequency bands different from one another in parallel with one another.

That is, according to one aspect of the present invention, an electric wave receiving apparatus to receive an electric wave including a time code includes: an antenna that receives an electric wave; a first amplifier that amplifies a signal received by the antenna; a plurality of filter circuits that extract signals in different frequency bands respectively from an output of the first amplifier; a plurality of detector circuits that demodulate the time codes respectively from outputs of the respective filter circuits correspondingly to the plurality of filter circuits; a plurality of automatic gain control circuits that respectively generate gain control signals indicating average signal levels of output signals of each of the detector circuits correspondingly to the plurality of detector circuits; a first selector that selects one gain control signal indicating a maximum signal level among the plurality of gain control signals output from the plurality of automatic gain control circuits; and an arithmetic processing section to be able to analyze the time codes by inputting outputs of the plurality of detector circuits, wherein the one gain control signal selected by the first selector is supplied to the first amplifier in order to an amplification factor of the first amplifier so that signal levels from the outputs output from the plurality of detector circuits do not become excessive; and the arithmetic processing section selects an output to enable the analysis of the time code among the respective outputs of the plurality of detector circuits to perform the analysis of the time code from the output.

Moreover, the present invention is an electric wave receiving apparatus to perform reception of an electric wave including a time code, including: an antenna that receives an electric wave; a tuning frequency switching circuit that enables a tuning frequency of the antenna to be switched into a plurality of kinds; a first amplifier that amplifies a signal received by the antenna; a plurality of filter circuits that make signals in different frequency bands correspondingly to the plurality of tuning frequencies pass from an output of the first amplifier; a third amplifier that amplifies outputs of the plurality of filter circuits; a first selecting switch that selects one of the outputs of the plurality of filter circuits and outputs the selected output to the third amplifier; a plurality of detector circuits that demodulate the time code from the output of each of the filter circuits through the third amplifier correspondingly to the plurality of filter circuits; a second selecting switch that outputs an output of the third amplifier to one of the plurality of detector circuits selectively; an automatic gain control circuit that generates a gain control signal indicating an average signal level of an output signal; a third selecting switch that selects one of output signals of the plurality of detector circuits to supply the selected output signal to the automatic gain control circuit; an arithmetic processing section that analyzes the time code by inputting outputs of the plurality of detector circuits; and a switching control circuit that controls switching of the tuning frequency switching circuit and the first to the third selecting switches respectively, wherein the switching control circuit controls the switching so that passing frequencies of the filter circuits connected to the third amplifier correspond to the tuning frequencies of the antenna; so that the filter circuits connected to the third amplifier correspond to the detector circuits; and so that the outputs of the detector circuits connected to the third amplifier are supplied to the automatic gain control circuit; in a state in which the tuning frequency switching circuit synchronizes with the first to the third selecting switches, and the switching is performed at a frequency higher than a data transmission frequency of the time code; and the arithmetic processing section selects an output to enable analysis of the time code out of each of the outputs of the plurality of detector circuits, and analyzes the time code from the selected output.

DETAILED DESCRIPTION OF THE PREFERRED EMBODIMENTS

In the following, the preferred embodiments of the present invention will be described with reference to the attached drawings.

First Embodiment

Figure 1:
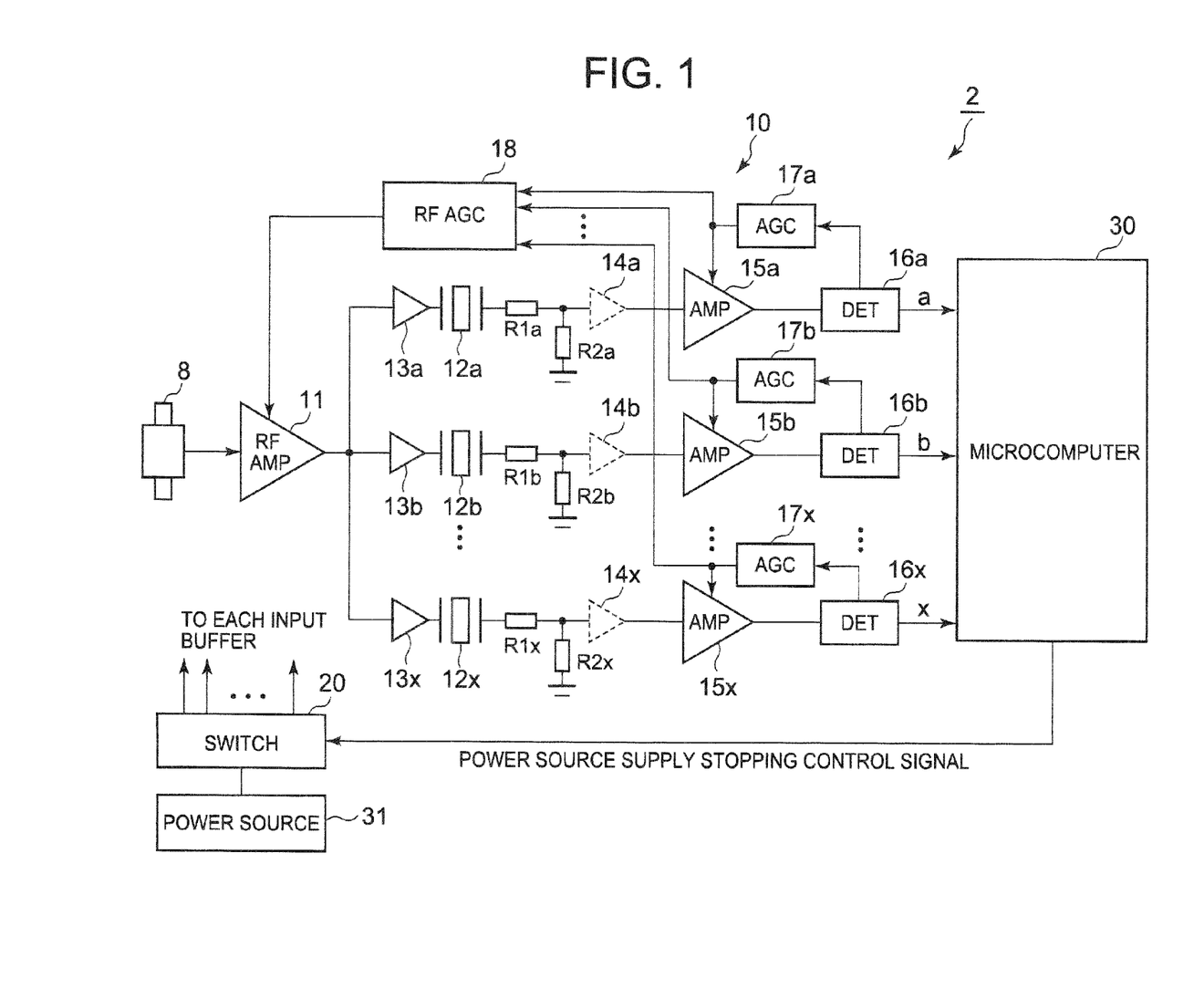
FIG. 1 is a block diagram showing a circuit configuration of a receiving circuit section and the periphery thereof of a first embodiment of the present invention.
Figure 2:
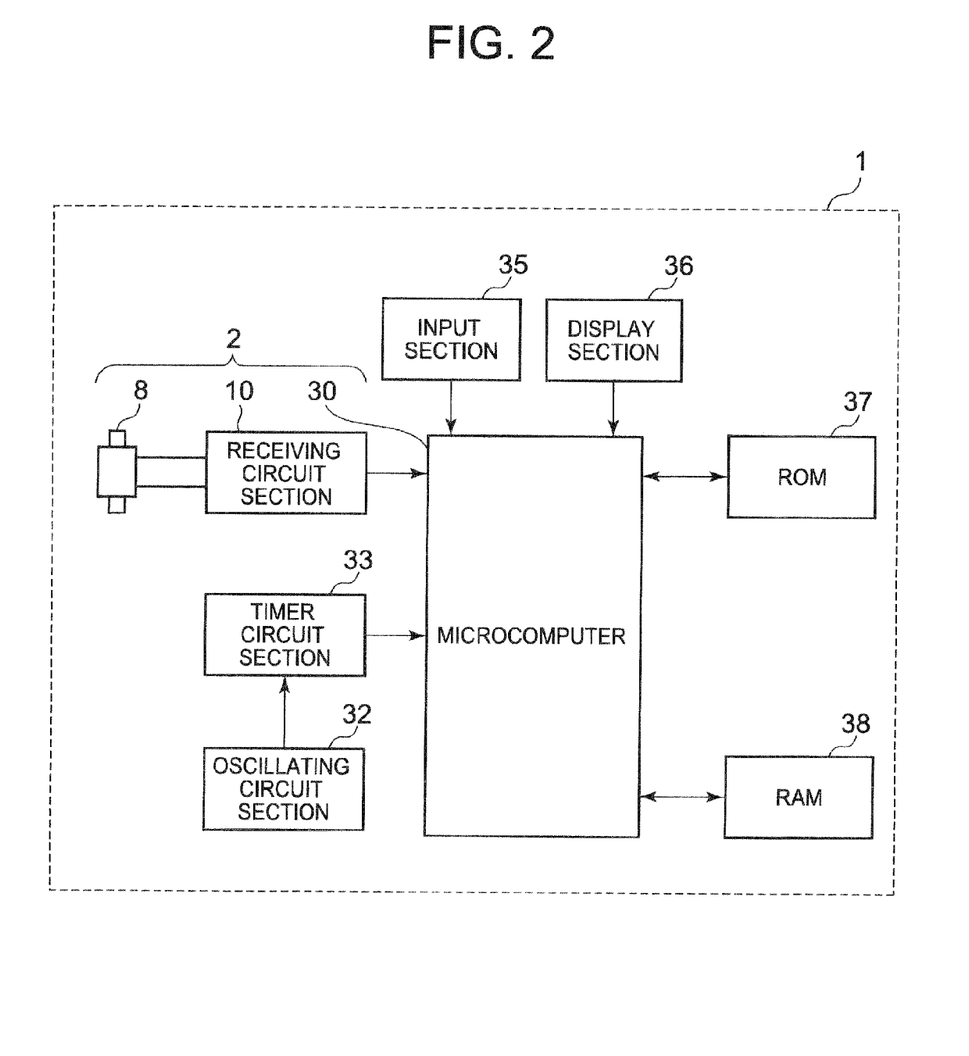
FIG. 2 is a block diagram showing the whole configuration of an electric wave clock in which the receiving circuit section of FIG. 1 is mounted.

FIG. 1 is a block diagram showing the circuit configuration of an electric wave receiving apparatus 2 of a first embodiment of the present invention. FIG. 2 is a block diagram showing the whole configuration of an electric wave clock in which the receiving circuit section of FIG. 1 is mounted.

The electric wave receiving apparatus 2 of the first embodiment receives a standard wave including a time code that is transmitted in Japan and the other countries, and the electric wave receiving apparatus 2 is mounted in an electric wave clock 1, which automatically corrects the time thereof by the standard wave.

As shown in FIG. 2, the electric wave receiving apparatus 2 of the embodiment is composed of an antenna 8 for the standard wave, which is made of a core material and a coil wound around the core material, a receiving circuit section 10 to perform the reception processing of the time code, and a microcomputer 30 to analyze the received time code.

As shown in FIG. 1, the receiving circuit section 10 is composed of an RF amplifier 11 to amplify a signal input from the antenna 8, a plurality of filter circuits 12a and 12b-12x provided in parallel with one another, buffer circuits (voltage buffers) 13a and 13b-13x for impedance adjustment, which are provided at the preceding stages of the filter circuits 12a and 12b-12x, respectively, intermediate amplifiers 15a and 15b-15x to amplify the signals passing the filter circuits 12a and 12b-12x, respectively, detector circuits 16a and 16b-16x to demodulate the time codes of the outputs of the intermediate amplifiers 15a and 15b-15x, respectively, AGC circuits 17a and 17b-17x to generate automatic gain control (AGC) signals indicating the average signal levels of the signals of the detector circuits 16a and 16b-16x, respectively, an RF-AGC circuit 18 to selectively output one AGC single among a plurality of AGC signals to the RF amplifier 11 to control the gain of the RF amplifier 11, a selecting switch 20 capable of switching the supply and the stop of the power source voltage to each of the buffer circuits 13a and 13b-13x from a power source 31, and the like.

The receiving circuit section 10 can be configured, for example, by being integrated on a semiconductor chip. Moreover, the residual part of the receiving circuit section 10 except for the RF amplifier 11 may be integrated on one semiconductor chip. Moreover, if the filter circuits 12a and 12b-12x cannot be integrated on a semiconductor chip together with the other circuits, then the receiving circuit section 10 is configured to extract wiring from the filter circuits 12a and 12b-12x and to connect the filter circuits 12a and 12b-12x with the circuits before and behind them. In this case, it is better to configure the receiving circuit section 10 by providing buffer circuits before and behind the filter circuits 12a and 12b-12x as the occasion demands so as to prevent the deterioration of a receiving signal.

The filter circuits 12a and 12b-12x is, for example, a MEMS filter composed of a board, a plurality of resonators to resonate at specific frequencies, and signal lines to pass electric signals along the resonators, which components are formed by a MEMS technique (the technique to form three-dimensional movable parts by the application of the micro-processing technique of an LSI). The mounting area of the MEMS filter of this kind is small, and the MEMS filter has a high-accuracy band-pass characteristic of a narrow signal passing band.

The band-passing frequency of each of the plurality of filter circuits 12a and 12b-12x is made to be different from one another by forming the sizes and the combinations of the resonators to be different from one another. The band-pass frequencies are set to be, for example, 40 kHz and 60 kHz, which are the frequencies of the standard waves in Japan, 75 kHz, 77.5 kHz, 100 kHz, and the like, which are the frequencies of the standard waves of the other countries. Moreover, the filter circuits having the passing frequency bands slightly different from those of the other filter circuits 12a and 12b-12x may be included in the receiving circuit section 10 for fine tuning.

The plurality of filter circuits 12a and 12b-12x is provided at the subsequent stage of the RF amplifier 11, and the signal amplified by the RF amplifier 11 is configured to input into the plurality of filter circuits 12a and 12b-12x through the buffer circuits 13a and 13b-13x. Moreover, each of elements R1a, R1b-R1x, R2a, and R2b-R2x, such as resisters, is connected to the subsequent stage of each of the filter circuits 12a and 12b-12x to perform impedance adjustment.

The detector circuits 16a and 16b-16x are circuits to perform the demodulation processing of the time codes subjected to amplitude modulation.

The AGC circuits 17a and 17b-17x receive the inputs of the outputs of the detector circuits 16a and 16b-16x, respectively, and generate AGC signals indicating the average signal levels of the inputs to output the generated AGC signals. That is, because the AGC circuits 17a and 17b-17x need to integrate the outputs of the detector circuits 16a and 16b-16x for a given length of time to generate the AGC signals, the AGC circuits 17a and 17b-17x respectively need several seconds to ten and several seconds from a state in which there are no outputs of the detector circuits 16a and 16b-16x to the time when the automatic gain control is stabilized after the input of the output signals of the detector circuits 16a and 16b-16x to the AGC circuits 17a and 17b-17x.

The amplifiers 15a and 15b-15x respectively operate to raise the amplification factor thereof when an input AGC signal level is low and to lower the amplification factor thereof when the input AGC signal level is high so that the input AGC signal level is kept at an almost constant level. Incidentally, the maximum gain of each of the intermediate amplifiers 15a and 15b-15x is set to a value at which a signal level can be made to be sufficiently high in the state in which a standard wave can normally be received, and each of the intermediate amplifiers 15a and 15b-15x has a characteristic in which the gain of the amplifier reaches the maximum value thereof at a stage at which the single level is not so high in the situation capable of receiving only minute noises.

The RF-AGC circuit 18 is a circuit to select and output an AGC signal indicating the maximum signal level of the received signal, that is, the AGC signal that lowers the gain most, among the respective AGC signals. The circuit of this kind can be composed of, for example, a selector circuit to output an arbitrary AGC signal among a plurality of AGC signals, a plurality of comparators to detect the magnitude of each AGC signal, an encoder to generate a selection signal of the selector circuit so that an AGC signal having the maximum signal level may be selected on the basis of each output of the plurality of comparators.

The selecting switch 20 enables the power source voltage to be supplied and intercepted to each of the buffer circuits 13a and 13b-13x at the preceding stages of the filter circuits 12a and 12b-12x, respectively, on the basis of the control of the microcomputer 30. That is, it is possible to make the operation of the circuits of each receiving channel (a filter circuit, an intermediate amplifier, and a detector circuit) to be active and inactive by the supply and the intercept of the power source voltage, respectively.

Then, if the selecting switch 20 is set so that the power source voltage is supplied to all the buffer circuits 13a and 13b-13x by the control of the microcomputer 30, then a received signal passes all the filter circuits 12a and 12b-12x, the intermediate amplifiers 15a and 15b-15x, and the detector circuits 16a and 16b-16x, respectively. Then the demodulated signals output from all the detector circuits 16a and 16b-16x are input into the microcomputer 30.

Moreover, if the power source voltage is supplied only to the buffer circuit 13x and the supply of the power source voltage to the other buffer circuits 13a, and so on is intercepted by the control of the microcomputer 30, then the received signal passes only the series of the buffer circuit 13x, the filter circuit 12x, the intermediate amplifier 15x, and the detector circuit 16x, and only one demodulated signal output by the detector circuit 16x is input into the microcomputer 30.

The microcomputer 30 is provided with AD converters to convert the signal input from each of the detector circuits 16a and 16b-16x into a digital signal and a central processing unit (CPU) to analyze the time code by executing a control program, and is thereby made to be possible to analyze the time code on the basis of the demodulated signal input from each of the detector circuits 16a and 16b-16x.

Moreover, as shown in FIG. 2, the electric wave clock 1 of the embodiment is provided with a timer circuit section 33 to time the present time, an oscillating circuit section 32 to supply a transmitting signal having a predetermined period to the timer circuit section 33, a read only memory (ROM) 37 to store a control program to be executed by the CPU in the microcomputer 30 and control data, a random access memory (RAM) 38 to provide a memory space for operations to the CPU, an input section 35 including a plurality of manual operation buttons to receive an operation input from a user, a display section 36 to display a time, and the like, in addition to the configuration of the electric wave receiving apparatus 2 mentioned above.

Next, the operation of the electric wave receiving apparatus 2 is described.

Figure 3:
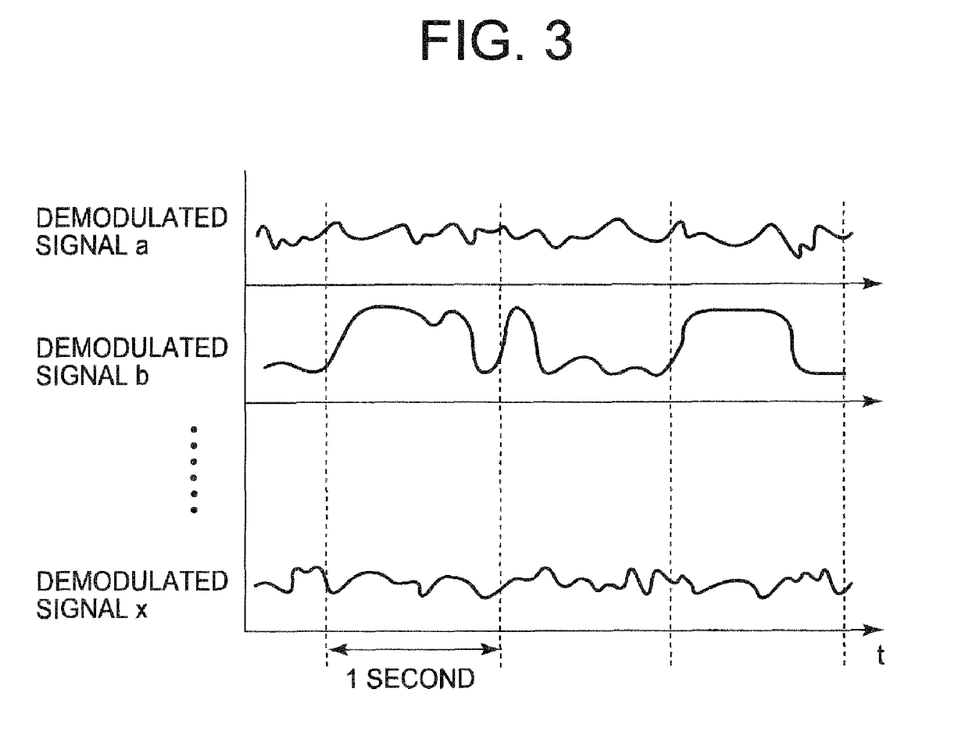
FIG. 3 is a waveform diagram showing signals in a plurality of frequency bands that are received by the receiving circuit section 10 at the time of a tuning mode.
Figure 4:
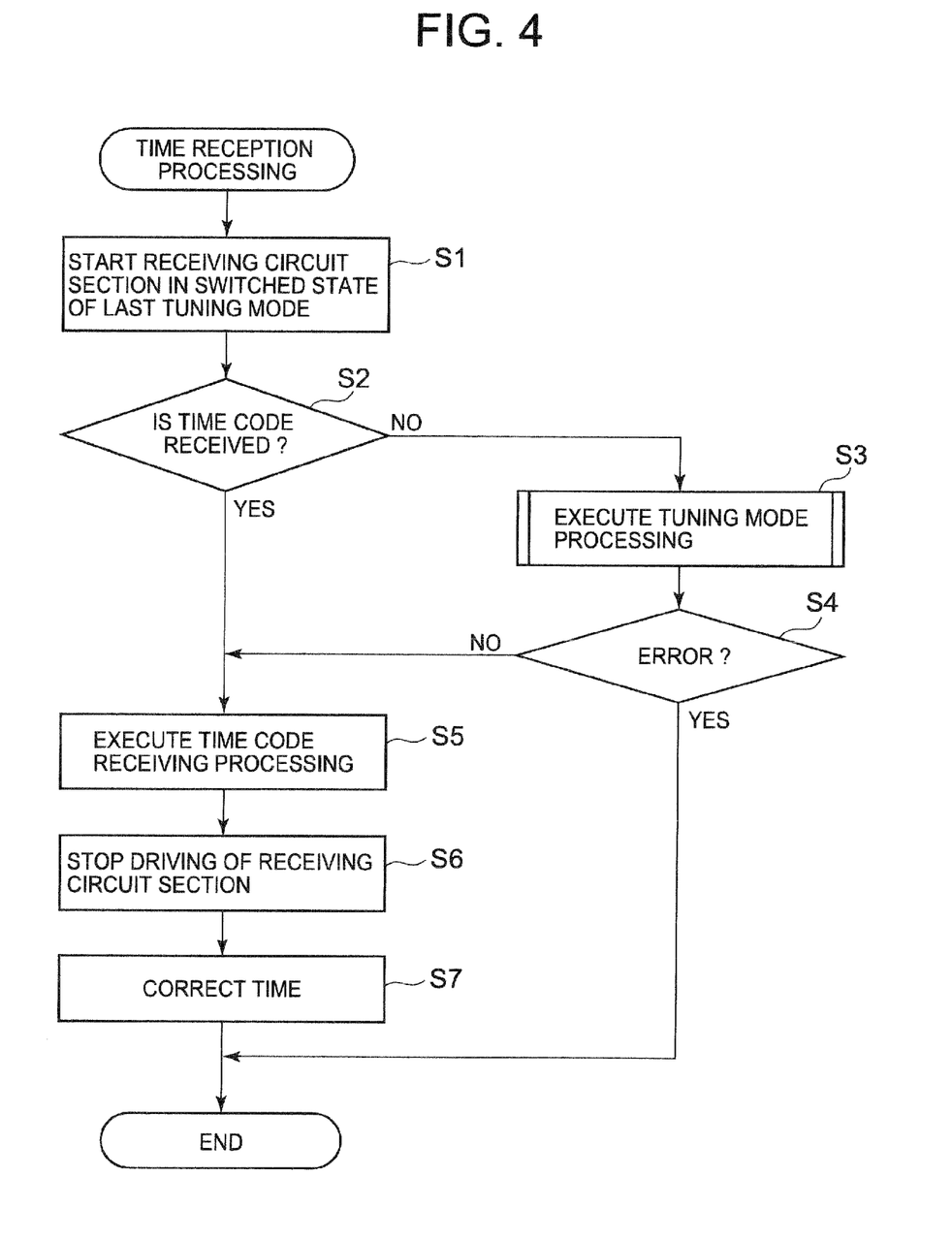
FIG. 4 is a flowchart showing the control procedure of time reception processing executed by a microcomputer.
Figure 5:
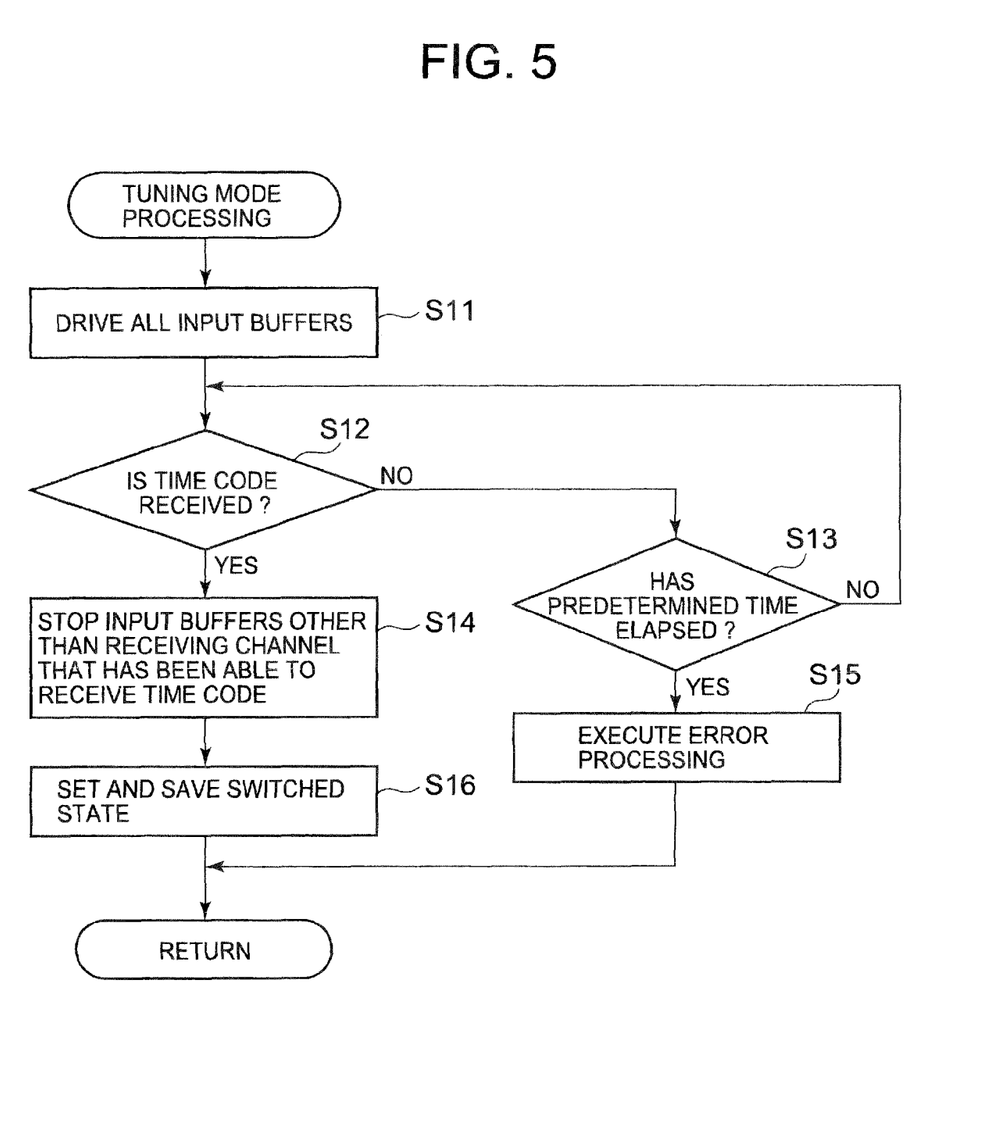
FIG. 5 is a flowchart showing the control procedure of the subroutine processing of the tuning mode processing at Step S3 in FIG. 4.

FIG. 4 is a flowchart of the time reception processing executed by the CPU of the microcomputer 30, and FIG. 5 is a flowchart of the tuning mode processing at Step S3 of FIG. 4. Moreover, FIG. 3 shows waveform diagrams showing an example of signals in a plurality of frequency bands received by the receiving circuit section 10 in a tuning mode.

For example, when it becomes a previously set time, or when a user performs an operation input to issue a reception request of a standard wave, the time reception processing of FIG. 4 is started by the CPU of the microcomputer 30.

When the time reception processing is started, the switched state of the last tuning mode is read from the RAM 38 or the like first, and the receiving circuit section 10 is started in the switched state (Step S1). That is, the set state of the selecting switch 20 is controlled so that a signal may be received at the frequency of the receiving channel through which the analysis of the time code has been succeeded in the last tuning mode, and the power source voltage is supplied only to the buffer circuit 13n of the receiving channel.

Thereby, the received signal passes through the filter circuit 12n, the intermediate amplifier 15n, and the detector circuit 16n corresponding to the receiving channel through which the analysis of the time code has succeeded in the last tuning mode, and the demodulated signal of the received signal is input into the microcomputer 30. Moreover, an AGC signal is generated by the AGC circuit 17n on the basis of the output of the detector circuit 16n, and is supplied to the corresponding intermediate amplifier 15n and the RF amplifier 11. Then, the gain control of the received signal is performed. Incidentally, because no signals are input into the detector circuits other than the receiving channel in this state, the AGC signal selected by the RF-AGC circuit 18 is the AGC signal corresponding to the detector circuit 16n, to which the received signal is input.

Then, if the electric wave reception processing mentioned above has been performed, then it is next confirmed whether a time code is received or not on the basis of the demodulated signal from the detector circuit 16n by analysis processing (Step S2). Then, for example, if the electric wave state has not been changed from that of the last tuning mode and the reception of the time code can be confirmed, then the time code is received as it is (Step S5). On the other hand, if the electric wave state has been changed from that of the last tuning mode, for example, the frequency of the standard wave has been changed owing to the movement from the Kyusyu district to the Tohoku district, and the reception of the time code cannot be confirmed, then the processing moves to the tuning mode processing (Step S3) to search for the receiving channel through which the time code can be received.

Then, if the tuning processing has been completed without any errors in the tuning mode processing, then the processing moves to that at Step S5 through the error judgment processing at Step S4, and the reception processing of the time code is executed in the tuned receiving channel. Moreover, if the tuning is not completed in the tuning mode processing and an error is caused, the reception of the time code at this time is abandoned, and the time reception processing is ended.

Moreover, if the reception processing of the time code has been completed at Step S5, then the drive of the receiving circuit section 10 is stopped (Step S6), and the time information in the timer circuit section 33 is corrected on the basis of the time code (Step S7). Then, the time reception processing is ended.

The tuning mode processing at Step S3 is executed as follows.

If the reception of any time code cannot be confirmed and the processing is moved to the tuning mode processing (Step S3 of FIG. 4), then, as shown in FIG. 5, the setting of the selecting switch 20 is change, and the power source voltage is supplied to all the buffer circuits 13a and 13b-13x first (Step S11).

Thereby, a received signal is input into the filter circuits 12a and 12b-12x, the intermediate amplifiers 15a and 15b-15x, and the detector circuits 16a and 16b-16x of all the receiving channels, and each of the demodulated signals of the detector circuits 16a and 16b-16x is input into the microcomputer 30. Moreover, the AGC signal corresponding to the receiving channel through which the signal level of the received signal becomes the highest among all the AGC signals is supplied to the RF amplifier 11 at this time.

Then, as shown in FIG. 3, a demodulated signal b of the receiving channel through which the strong standard wave is received becomes a signal expressing the time code having a constant signal level among all the demodulated signals a and b-x input into the microcomputer 30, but the demodulated signals a, and so on of the other receiving channels become signals having small signal levels and including manifested noises by the circuit operation of this kind.

After the execution of this reception processing, the CPU in the microcomputer 30 next judges the existence of a signal that can be confirmed as the time code from the demodulated signals a-x by the analysis processing (Step S12) If the confirmation cannot be performed, then the CPU repeats the analysis processing until a predetermined time has elapsed (Step S13). If the reception of the time code is confirmed, then the CPU moves the processing thereof to that at Step S14, and controls the selecting switch 20 to stop the supply of the power source voltages to the buffer circuits 13a and 13b-13x except for that in the receiving channel through which the reception of the time code has succeeded (Step S14). Then, the CPU saves the switched state in the RAM 38 or the like (Step S16), and ends the tuning mode processing.

On the other hand, if the reception of the time code has not been confirmed even if the predetermined time has elapsed, then the CPU performs error setting and the like (Step S15), and ends the tuning mode processing.

As described above, according to the electric wave receiving apparatus 2 of this embodiment, a standard wave can be received by a plurality of receiving channels, and the receiving channel through which the standard wave can be received can be searched for at a high speed at the time of searching for the receiving channel through which the standard wave can be received. For example, if a received signal is verified every channel by switching receiving channels, then several seconds to ten and several seconds are needed until the AGC is stabilized at the time of the switching. Consequently, it takes a long time to verify the received signal by switching all the receiving channels. However, according to the configuration of the embodiment, because the AGC circuits 17a and 17b-17x and the detector circuits 16a and 16b-16x are provided to the plurality of receiving channels, and the signal of each receiving channel can be verified in the state in which each receiving channel is driven at the same time. Consequently, the long time mentioned above is not needed, and the receiving channel through which the time code can be received can be searched for rapidly.

Incidentally, it is also possible to provide buffer circuits 13Ba and 13Bb-13Bx for impedance adjustment at the subsequent stage of the filter circuits 12a and 12b-12x, respectively, in the circuit configuration of the electric wave receiving apparatus 2 of FIG. 1, or it is also possible to configure the circuit of the electric wave receiving apparatus 2 so as to omit the intermediate amplifiers 15a and 15b-15x in place of the provision of the buffer circuits 13Ba and 13Bb-13Bx, respectively.

Second Embodiment

Figure 6:
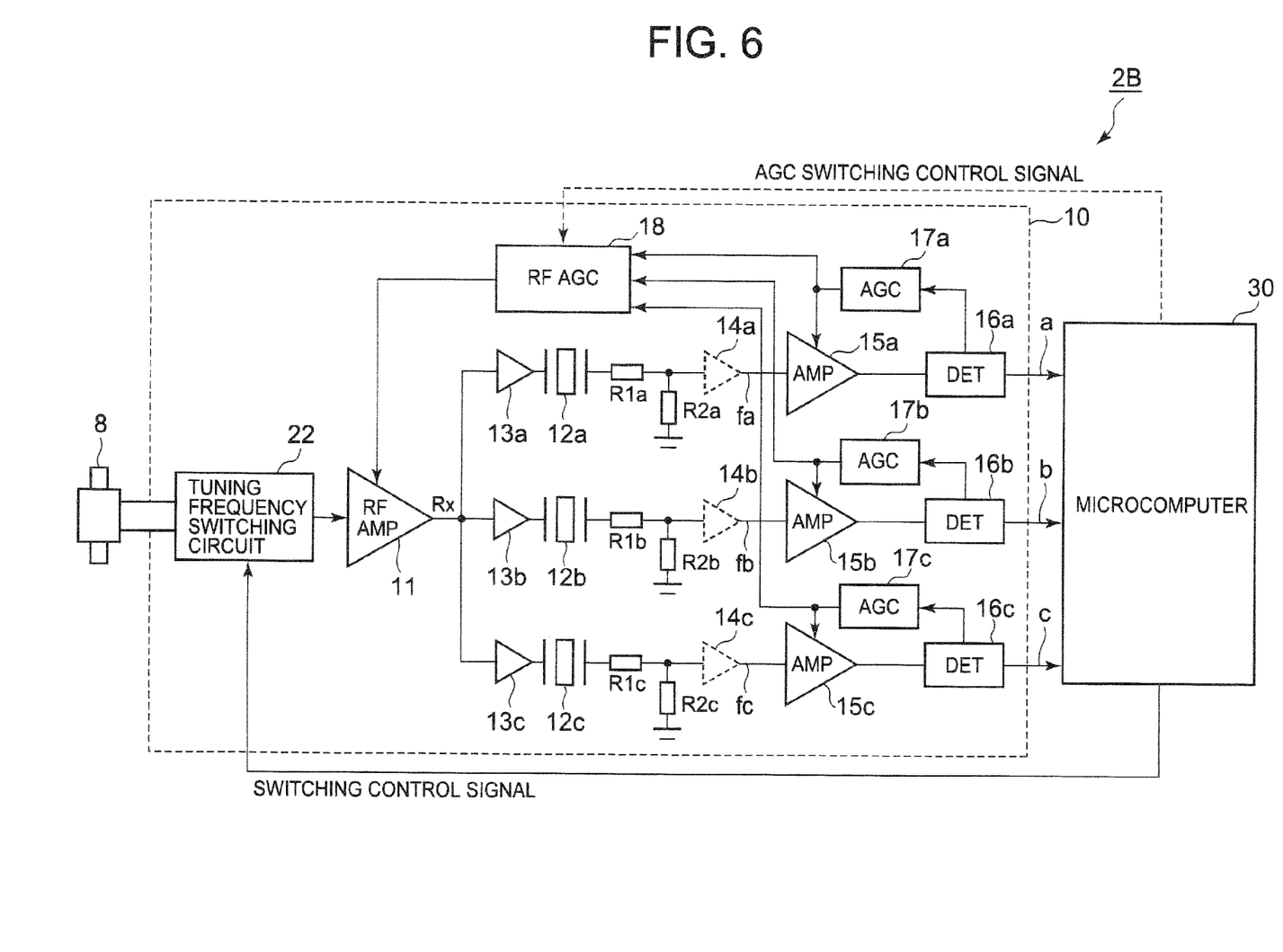
FIG. 6 is a block diagram showing a circuit configuration of a receiving circuit section and the periphery thereof of a second embodiment of the present invention.

FIG. 6 is a block diagram showing the circuit configuration of an electric wave receiving apparatus 2B of a second embodiment of the present invention.

The electric wave receiving apparatus 2B of the second embodiment is further provided with a tuning frequency switching circuit 22 to change the tuning frequency of the antenna 8, and the other parts of the configuration of the second embodiment is almost the same as those of the first embodiment. Moreover, although the selecting switch 20 to supply and intercept of the power source voltages to the buffer circuits 13a and 13b-13x is omitted to be shown, the selecting switch 20 is provided to the second embodiment similarly to the first embodiment.

The tuning frequency switching circuit 22 is composed of, for example, a plurality of capacitor devices capable of parallel connected to the both ends of the coils of the antenna 8, semiconductor switches to turning on and off the connections of the capacitor devices, and the like. The tuning frequencies of the antenna 8, which are switched by the tuning frequency switching circuit 22, are designed so as to be in the relation of corresponding to the respective passing frequency bands of the plurality of filter circuits 12a and 12b-12x (that is, so as to be the same frequency bands as the respective passing frequency bands).

Moreover, the microcomputer 30 is adapted to perform the switching of the tuning frequency switching circuit 22 at a frequency sufficiently higher than the transmission frequency (for example 1 Hz) of one data pulse of the time code at the time of a tuning mode. For example, the microcomputer 30 is adapted to perform the switching of the tuning frequency switching circuit 22 every 10 ms.

Moreover, the function of the RF-AGC circuit 18 in the circuit configuration of the electric wave receiving apparatus 2B in the second embodiment may be changed from the function of supplying the AGC signal indicating the maximum signal level to the RF amplifier 11 selectively to the function of switching the AGC signal supplied to the RF amplifier 11 selectively by an AGC switching control signal from the microcomputer 30.

If the function of the RF-AGC circuit 18 is changed in this manner, then the microcomputer 30 performs the switching of the selection of the RF-AGC circuit 18 in synchronization with the switching of the tuning frequency switching circuit 22. Moreover, the switching of the selection of the RF-AGC circuit 18 is adapted so that the AGC signal supplied to the RF amplifier 11 may accord with the AGC signal generated by the received signal passing one of the filter circuits 12a, 12b, and 12c having the passing frequency corresponding to the tuning frequency selected by the tuning frequency switching circuit 22.

Figure 7A:
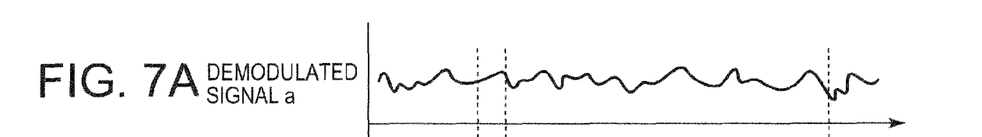
FIG. 7A is a waveform diagram showing a demodulated signal a for illustrating an output Rx of the RF amplifier of FIG. 6 in a tuning mode.
Figures 7B, 7C:
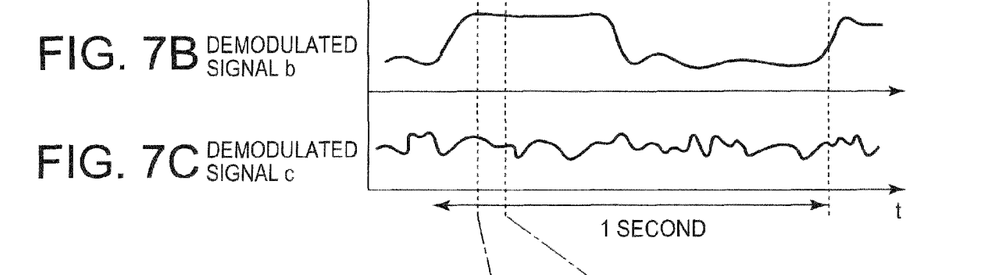
FIG. 7B is a waveform diagram showing a demodulated signal b for illustrating the output Rx of the RF amplifier of FIG. 6 in the tuning mode.
FIG. 7C is a waveform diagram showing a demodulated signal c for illustrating the output Rx of the RF amplifier of FIG. 6 in the tuning mode.
Figure 7D:
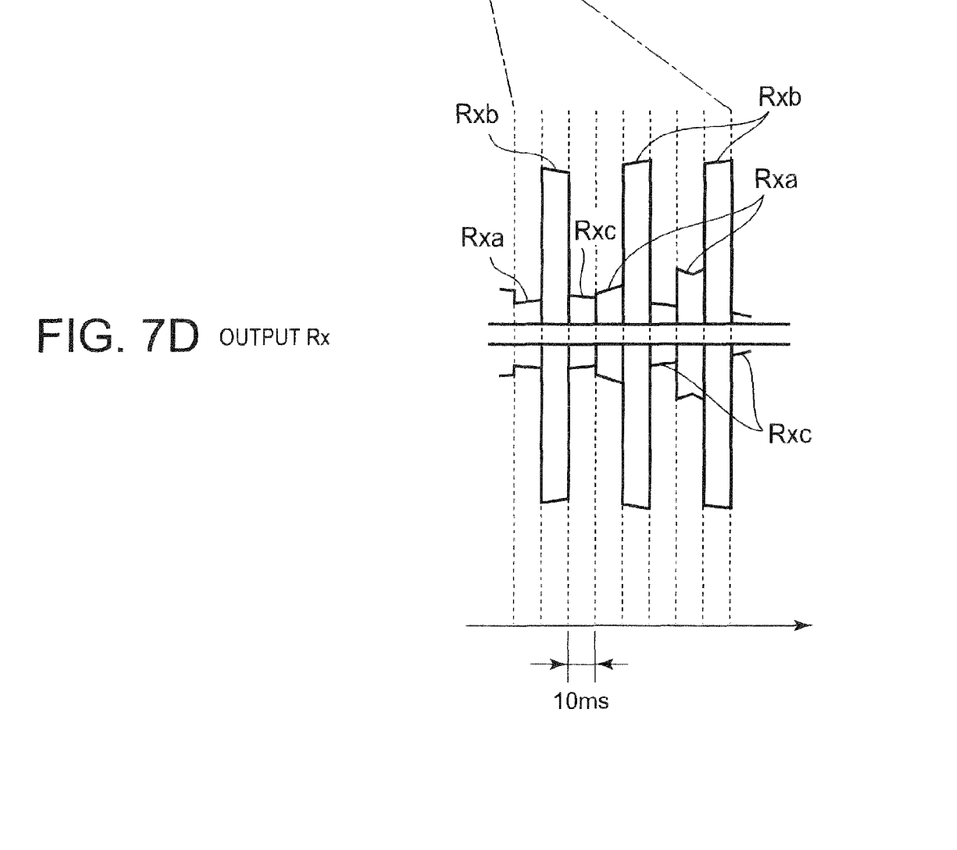
FIG. 7D is a waveform diagram illustrating the output Rx of the RF amplifier of FIG. 6 in the tuning mode.
Figure 8A:
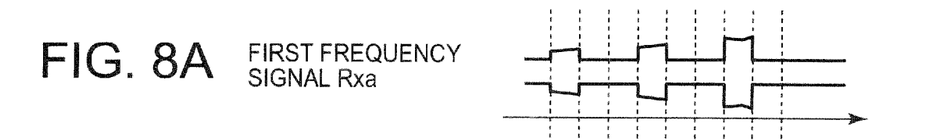
FIG. 8A is a waveform diagram showing the signal Rx input into each filter circuit in the tuning mode in the state of being separated in a first frequency band.
Figure 8B:
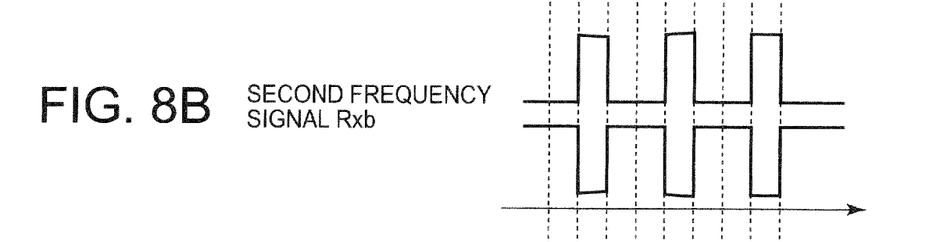
FIG. 8B is a waveform diagram showing the signal Rx input into each filter circuit in the tuning mode in the state of being separated in a second frequency band.
Figure 8C:
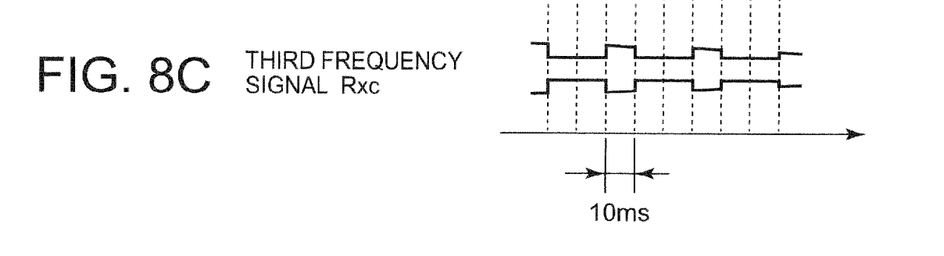
FIG. 8C is a waveform diagram showing the signal Rx input into each filter circuit in the tuning mode in the state of being separated in a third frequency band.
Figure 9A:
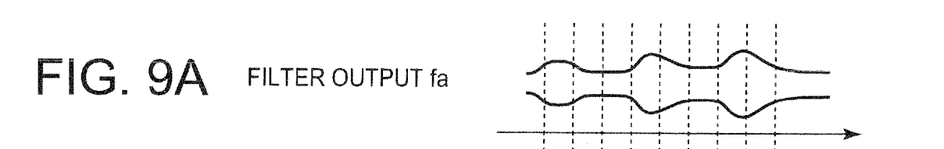
FIG. 9A is a waveform diagram showing a signal fa passing each filter circuit at the time of the tuning mode.
Figure 9B:
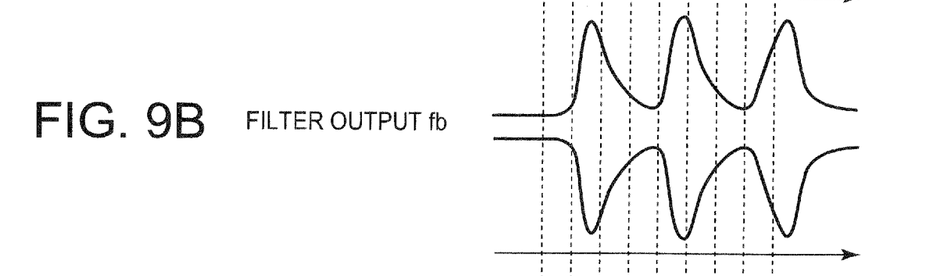
FIG. 9B is a waveform diagram showing a signal fb passing each filter circuit at the time of the tuning mode.
Figure 9C:
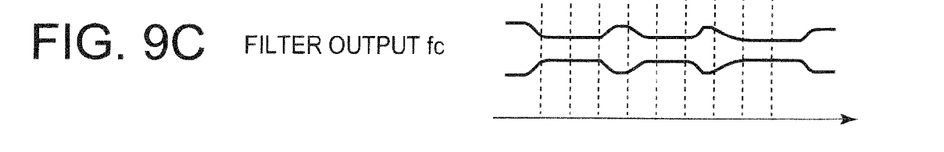
FIG. 9C is a waveform diagram showing a signal fc passing each filter circuit at the time of the tuning mode.

FIGS. 7A-7C are waveform diagrams of demodulated signals a-c; FIG. 7D is a waveform diagram illustrating an output Rx of the RF amplifier 11 at the time of a tuning mode; FIGS. 8A-8C are waveform diagrams showing the signal Rx input into each filter circuit at the time of the tuning mode in the state of being separated into each frequency band; and FIGS. 9A-9C are waveform diagrams showing signals fa-fc passing each filter circuit in the tuning mode.

By the configuration mentioned above, the tuning frequencies of the antenna 8 are switched in a short cycle at the time of the tuning mode. For example, if there are three receiving channels, the output signal Rx of the RF amplifier 11 becomes a signal shown in FIG. 7D. That is, the output signal Rx is a signal including an output signal Rxa in the frequency band of a first receiving channel through which only noises are received, an output signal Rxb in the frequency band of a second receiving channel including the time code, and an output signal Rxc in the frequency band of a third receiving channel through which only noises are received, which output signals Rxa, Rxb, and Rxc are switched every 10 ms. The output signals Rxa and Rxc, which include only noises, have low signal levels, and the output signal Rxb, which includes the time code, has a high signal level.

Then, the output signal Rx of this kind is input into the three filter circuits 12a, 12b, and 12c. If the output signal Rx is shown by being separated into the signals of the frequency bands capable of passing through the respective filter circuits 12a, 12b, and 12c, then the output signal Rx becomes the output signals Rxa, Rxb and Rxc of FIGS. 8A-8C, respectively. Then, when the output signal Rx of this sort of RF amplifier 11 passes through the filter circuits 12a, 12b, and 12c, the output signal Rx becomes the signals fa-fc, respectively, having dull envelopes as shown in FIGS. 9A-9C. Then, the demodulated signal in each receiving channel shown in FIGS. 7A-7C can be obtained by amplifying the output signal Rx by the intermediate amplifiers 15a, 15b, and 15c, and by performing the amplitude demodulation thereof by the detector circuits 16a, 16b, and 16c, respectively.

Figure 10:
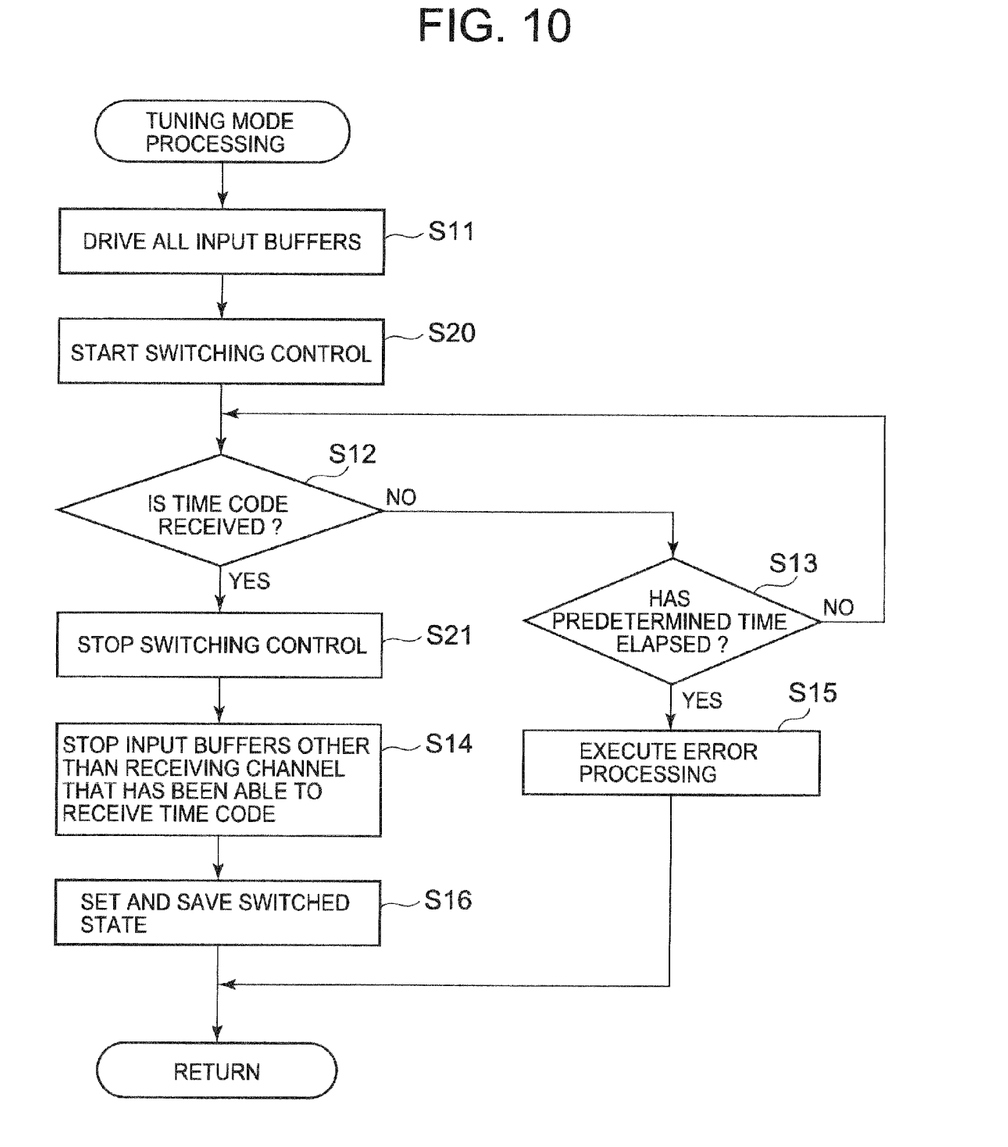
FIG. 10 is a flowchart showing the control procedure of tuning mode processing in a second embodiment of the present invention.

FIG. 10 shows a flowchart of the tuning mode processing in the second embodiment of the present invention.

The tuning mode processing of the embodiment is the processing almost the same as the tuning mode processing (FIG. 5) of the first embodiment. The differentiae of the tuning mode processing of this embodiment from that of the first embodiment are to insert the processing of starting the switching control of the tuning frequency of the antenna 8 (and the selection of the AGC signal in the RF-AGC circuit 18) after driving all the buffer circuits 13a, 13b, and 13c at Step S11 (Step S20) and to insert the processing of stopping the switching control mentioned above after the confirmation of the reception of a time code (Step S21).

That is, the selection and the switching of the tuning frequency of the antenna 8 and the AGC signal of the RF-AGC circuit 18 are performed, for example, every 10 ms by starting the switching control at Step S20 in the time of the tuning mode. Then, as described above, the output signal Rx of FIG. 7D is thereby input into the plurality of filter circuits 12a, 12b, and 12c, and only the signals of the respective reception frequencies pass the filter circuits 12a, 12b, and 12c to be sent to the detector circuits 16a, 16b, and 16c through the intermediate amplifiers 15a, 15b, and 15c, respectively. As the result, the same demodulated signals as those of the first embodiment are transmitted from the detector circuits 16a, 16b, and 16c to the microcomputer 30, and the microcomputer 30 can confirm the receiving channel through which time code has been received. Then, when the confirmation of the receiving channel through which the time code has been received can be performed, the CPU stops the selection switching of the tuning frequency of the antenna 8 and the AGC signal by the RF-AGC circuit 18 at Step S21, and performs the same post-processing as that of the tuning mode processing of the first embodiment to escape the tuning mode.

According to the electric wave receiving apparatus 2B of the embodiment, even if the reception band of the antenna 8 is narrow, the electric wave receiving apparatus 2B performs signal reception, switching the tuning frequency of the antenna 8 according to a plurality of receiving channels. Consequently, the effect of being capable of searching for a receiving channel through which the time code can be received among all the receiving channels can be obtained.

Moreover, by switching the tuning frequency of the antenna 8, the level of the signal passing through each of the filter circuits 12a, 12b, and 12c greatly changes at the switching period of the tuning frequency, but the influences of the switching to the signal passing through the filter circuits 12a, 12b, and 12c and the detector circuits 16a, 16b, and 16c are excluded. Consequently, the demodulated signals from the detector circuits 16a, 16b, and 16c are always input into the respective AGC circuits 17a, 17b, and 17c, and the AGC is in the state of being stabilized always. Accordingly, it is unnecessary to wait the stabilization of an AGC signal at the time of switching the receiving channel, and the effect of being capable of searching for the receiving channel through which the time code can be received from a plurality of receiving channels at a high speed can be obtained.

Third Embodiment

Figure 11:
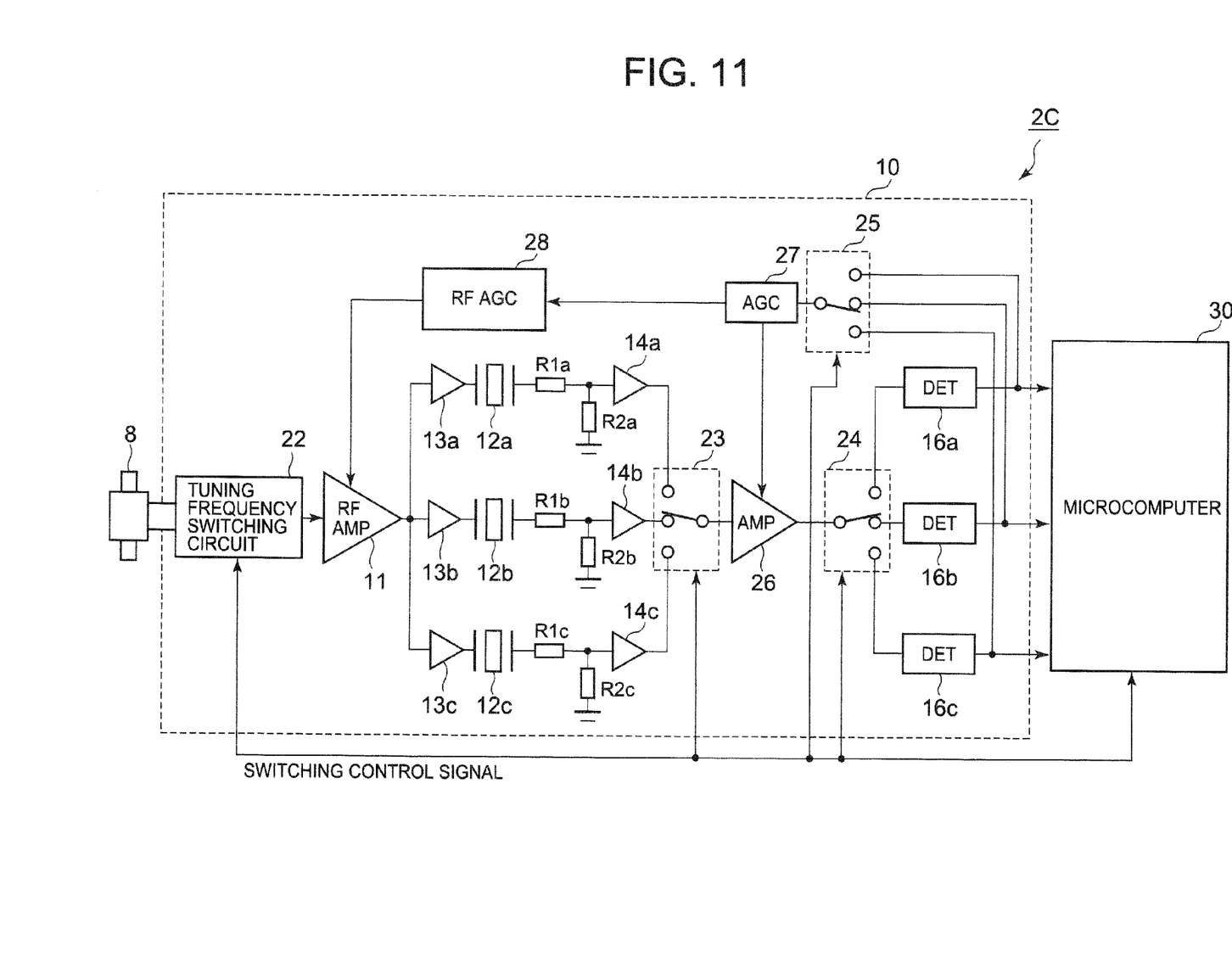
FIG. 11 is a block diagram showing the circuit configuration of the receiving circuit section and the periphery thereof of a third embodiment of the present invention.

FIG. 11 is a block diagram showing an electric wave receiving apparatus 2C of a third embodiment of the present invention.

The electric wave receiving apparatus 2C of the third embodiment includes only one intermediate amplifier 26 and only one AGC circuit 27, and is adapted to be used by switching the signals of the respective receiving channels passing through the intermediate amplifier 26 and the AGC circuit 27 with selecting switches 23-25. The other configuration components are almost the same as those of the electric wave receiving apparatus 2B of the second embodiment. The same configuration components are denoted by the same signs as those of the electric wave receiving apparatus 2B, and their descriptions are omitted. Moreover, the selecting switch 20 to supply and intercept the power source voltages of the electric wave receiving apparatus 2C is also omitted to be shown in FIG. 11, but the selecting switch 20 is also provided to the electric wave receiving apparatus 2C similarly to the first embodiment.

The third embodiment is provided with the one intermediate amplifier 26 between the filter circuits 12a, 12b, and 12c and the detector circuits 16a, 16b, and 16c, both corresponding to a plurality of receiving channels, through the selecting switches 23 and 24. Moreover, in order to make the selecting switch 23 intervene, the buffer circuits 14a, 14b, and 14c are inserted at the subsequent stages of the filter circuits 12a, 12b, and 12c, respectively.

Furthermore, any one of the plurality of outputs of the detector circuits 16a, 16b, and 16c is adapted to be output to the one AGC circuit 27 through the selecting switch 25. Then, an AGC signal to indicate the average signal level of the signal input from the selecting switch 25 is generated by the AGC circuit 27, and the generated AGC signal is supplied to the intermediate amplifier 26 and the RF amplifier 11 to perform the gain control so as to keep the signal level to be constant. Incidentally, the AGC signal may be output to the RF amplifier 11 after the characteristic of the AGC signal has been changed by an RF-AGC circuit 28.

The selecting switches 23-25 are made by, for example, forming a plurality of semiconductor switches, such as MOS transistor switches, respectively.

The tuning frequency switching circuit 22 and the selecting switches 23-25 are adapted to be mutually synchronously switched at a frequency (for example 100 Hz) sufficiently higher than the transmission frequency (for example 1 Hz) of one data pulse of a time code by the microcomputer 30 in the third embodiment. The switching control is performed at the time of the tuning mode.

Moreover, the selecting switches 23-25 are switched so that the tuning frequency of the antenna 8 switched by the tuning frequency switching circuit 22 may correspond to the band-passing frequency of the filter circuit (any one of the filter circuits 12a-12c) connected to the intermediate amplifier 26; so that the detector circuit (any one of the detector circuits 16a-16c) connected to the intermediate amplifier 26 may correspond to the filter circuit connected to the intermediate amplifier 26; and so that the output from the detector circuit (any one of the detector circuits 16a-16c) connected to the intermediate amplifier 26 may be output to the AGC circuit 27.

Also in this sort of configuration, it becomes possible to obtain the demodulated signal of a received signal in each of the receiving channels from each of the detector circuits 16a, 16b, and 16c by receiving the signals of a plurality of receiving channels, switching the signals at a short period, at the time of the tuning mode. Then, thereby, the effect of enabling the searching for the receiving channel through which the time code can normally be received can be obtained.

Moreover, by the routes to transmit signals from the filter circuits 12a, 12b, and 12c to the detector circuits 16a, 16b, and 16c, respectively, are switched by the selecting switches 23 and 24, the signals passing through the filter circuits 12a, 12b, and 12c and the detector circuits 16a, 16b, and 16c are made to be intermittent. However, the short interceptions of the input signals into the detector circuits 16a, 16b, and 16c do not so much influence the demodulated signals owing to the amplitude demodulation processing of the detector circuits 16a, 16b, and 16c, and the outputs of the plurality of detector circuits 16a, 16b, and 16c are always input into the AGC circuit 27, being switched. Consequently, because the AGC circuit 27 is always made to be in the state of performing the AGC operation thereof, the situation in which it takes a long tome from a stop of the AGC operation thereof to the return thereof and the stabilization thereof does not arise. Consequently, the effect of the possibility of high speed searching of the receiving channel through which the time code can be received among the plurality of receiving channels can similarly be obtained.

Incidentally, the present invention is not limited to the first to the third embodiments mentioned above, but various changes can be performed. For example, although the MEMS filter is exemplified as the filter circuits 12a and 12b-12x, a crystal filter or the like can be used if the number of the receiving channels is small. Moreover, although in the embodiment mentioned above, the analysis processing of a time code, the switching control of the tuning frequencies, and the switching control of the selecting switches 23-25 are performed by the one microcomputer 30, the switching control may be performed by another control circuit. Moreover, although the switching section of the supply and the interception of power source voltage of the buffer circuits 13a and 13b-13x is used for making the circuits of the receiving channels that are not used to be inactive in the normal reception processing of the time code, a section of connecting and intercepting the signal lines or a section of intercepting the supply of the power source voltages to the intermediate amplifiers 15a and 15b-15x or the detector circuits 16a, 16b, and 16c that are not used may be used.

What is claimed is:
1. An electric wave receiving apparatus that receives an electric wave including a time code, comprising:
  an antenna that receives an electric wave;
  a first amplifier that amplifies a signal received by the antenna;
  a plurality of filter circuits that extract signals in different frequency bands respectively from an output of the first amplifier;
  a plurality of detector circuits that demodulate time codes respectively from outputs of the respective filter circuits correspondingly to the plurality of filter circuits;
  a plurality of automatic gain control circuits that respectively generate gain control signals indicating average signal levels of output signals of the detector circuits correspondingly to the plurality of detector circuits;
  a first selector that selects one gain control signal indicating a maximum signal level among the plurality of gain control signals output from the plurality of automatic gain control circuits; and
  an arithmetic processing section to be able to analyze the time codes by inputting outputs of the plurality of detector circuits, wherein
  the one gain control signal selected by the first selector is supplied to the first amplifier in order to control an amplification factor of the first amplifier so that signal levels output from the plurality of detector circuits do not become excessive, and
  the arithmetic processing section selects an output to enable the analysis of the time code among the respec- tive outputs of the plurality of detector circuits to perform the analysis of the time code from the output.

2. The electric wave receiving apparatus according to claim 1, further comprising:
a tuning frequency switching circuit capable of switching a tuning frequency of the antenna to a plurality of kinds correspondingly to passing frequencies of the filter circuits; and
a switching control circuit to perform switching control of the tuning frequency switching circuit, the switching control circuit switching the tuning frequency at a frequency higher than a data transmission frequency of the time code.

3. The electric wave receiving apparatus according to claim 2, further comprising a second selector that outputs a gain control signal specified by a select signal among the plurality of gain control signals output from the plurality of automatic gain control circuits to supply the output gain control signal to the first amplifier in place of the first selector, wherein
the switching control circuit synchronizes the switching of the tuning frequency with the switching of the gain control signal to performs the switching of the select signal so that the gain control signal selected by the second selector may become a gain control signal generated on a basis of the signal passing the filter circuit having the passing frequency corresponding to the tuning frequency of the antenna.

4. The electric wave receiving apparatus according to claim 1, further comprising a plurality of second amplifiers that amplifies signals of the plurality of filter circuits, respectively, to output the amplified signals to the plurality of detector circuits, respectively, correspondingly to the plurality of filter circuits, wherein
the plurality of gain control signals generated by the plurality of automatic gain control circuits is supplied to the plurality of second amplifiers outputting the signals to the corresponding detector circuits, respectively, in order to control amplification factors of the second amplifiers so that output levels of the corresponding detector circuits do not become excessive.

5. The electric wave receiving apparatus according to claim 1, wherein the plurality of filter circuits are configured of MEMS filters respectively, and
a buffer circuit for impedance adjustment is provided at a preceding stage of each of the MEMS filters.

6. An electric wave receiving apparatus to perform reception of an electric wave including a time code, comprising:
an antenna that receives an electric wave;
a tuning frequency switching circuit that enables a tuning frequency of the antenna to be switched into a plurality of kinds;
a first amplifier that amplifies a signal received by the antenna;
a plurality of filter circuits that make signals in different frequency bands correspondingly to the plurality of tuning frequencies pass from an output of the first amplifier;
a third amplifier that amplifies outputs of the plurality of filter circuits;
a first selecting switch that selects one of the outputs of the plurality of filter circuits and outputs the selected output to the third amplifier;
a plurality of detector circuits that demodulate the time code from the output of each of the filter circuits through the third amplifier correspondingly to the plurality of filter circuits;
a second selecting switch that outputs an output of the third amplifier to one of the plurality of detector circuits selectively;
an automatic gain control circuit that generates a gain control signal indicating an average signal level of an output signal;
a third selecting switch that selects one of output signals of the plurality of detector circuits to supply the selected output signal to the automatic gain control circuit;
an arithmetic processing section that analyzes the time code by inputting outputs of the plurality of detector circuits; and
a switching control circuit that controls switching of the tuning frequency switching circuit and the first to the third selecting switches respectively, wherein
the switching control circuit controls the switching so that passing frequencies of the filter circuits connected to the third amplifier correspond to the tuning frequencies of the antenna; so that the filer circuits connected to the third amplifier correspond to the detector circuits; and so that the outputs of the detector circuits connected to the third amplifier are supplied to the automatic gain control circuit; in a state in which the tuning frequency switching circuit synchronizes with the first to the third selecting switches, and the switching is performed at a frequency higher than a data transmission frequency of the time code; and
the arithmetic processing section selects an output to enable analysis of the time code out of each of the outputs of the plurality of detector circuits, and analyzes the time code from the selected output.

7. The electric wave receiving apparatus according to claim 6, wherein
the plurality of filter circuits are made of a MEMS filter respectively, and
buffer circuits for impedance adjustment are provided at a preceding stage and a subsequent stage of each of the MEMS filters respectively.

8. The electric wave receiving apparatus according to claim 6, further comprising a control section that controls electric wave reception processing, wherein
the control section makes the switching control circuit execute the switching control to search for a receiving channel through which signal reception of the time code is enabled in a tuning mode to search for the receiving channel of the electric wave including the time code, and makes the reception of the electric wave with the switching control fixed to a switched state of the receiving channel searched in the tuning mode in a time receiving mode to receive the time code.

9. The electric wave receiving apparatus according to claim 8, further comprising a change-over switch capable of switching only a circuit of one receiving channel to be active and circuits of other receiving channels to be inactive, wherein
the control section switches a circuit of an unused receiving channel to be inactive by the change-over switch in the time receiving mode.

* * * * *